T. P. MADDOX.
PRESS FOR FRUIT.
APPLICATION FILED JUNE 15, 1909.
960,102.
Patented May 31, 1910.
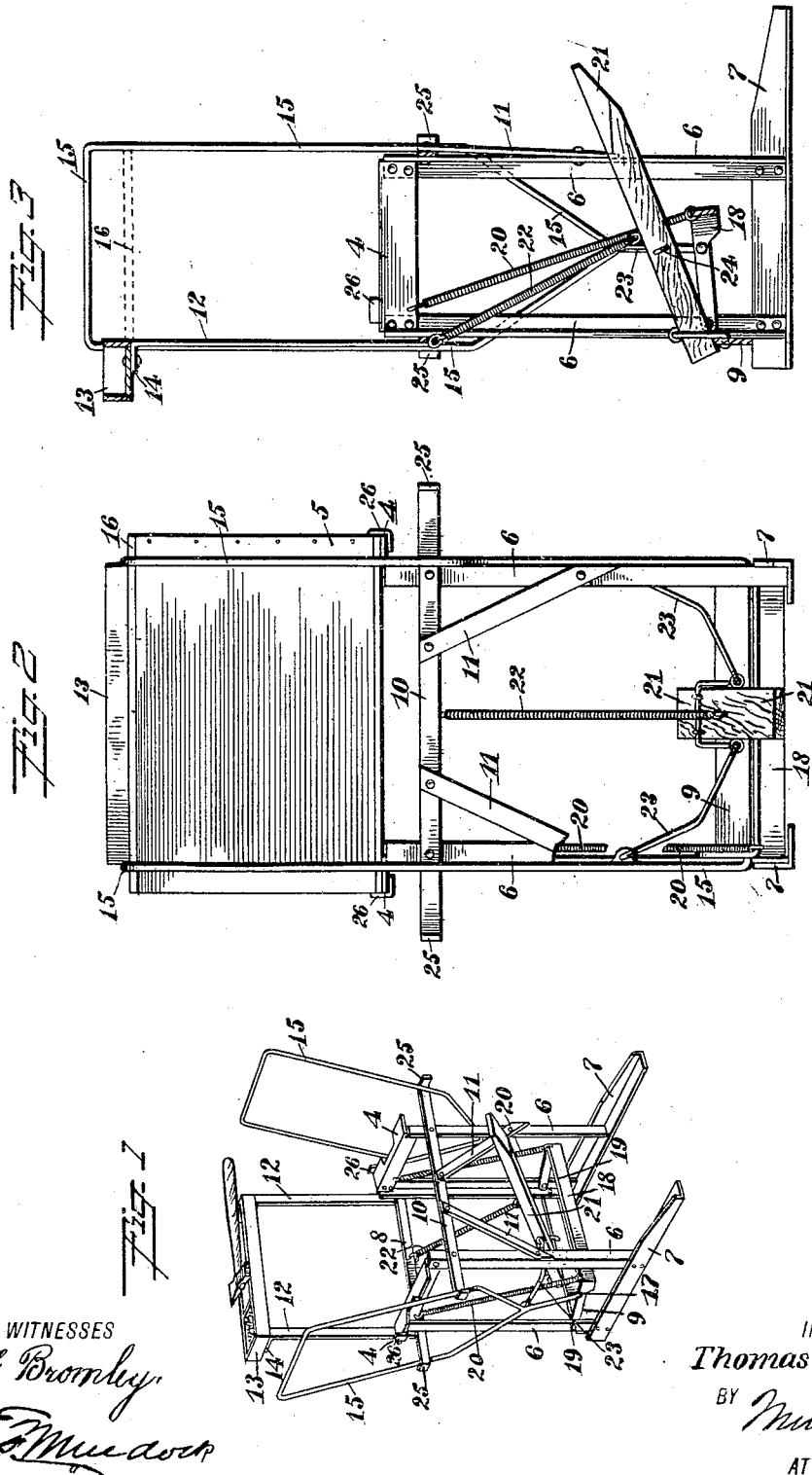
WITNESSES
INVENTOR
Thomas P. Maddox
BY
ATTORNEYS

UNITED STATES PATENT OFFICE.

THOMAS PLINY MADDOX, OF AZTEC, TERRITORY OF NEW MEXICO.

PRESS FOR FRUIT.

960,102.  Specification of Letters Patent.  Patented May 31, 1910.

Application filed June 15, 1909. Serial No. 502,196.

*To all whom it may concern:*

Be it known that I, THOMAS P. MADDOX, a citizen of the United States, and resident of Aztec, in the county of San Juan and Territory of New Mexico, have invented a certain new and useful Press for Fruit, of which the following is a full, clear, and exact description.

The principal objects which the present invention has in view are: to provide a device to maintain the covers of fruit crates in position to be secured to the body of the crate, and during the operation of securing the same; to provide a device in which the packing pressure for fruit may be applied while, and in the act, of placing the cover in position; to provide a device for holding the cover in position to be secured, which device carries in convenient position a receptacle for the fastening devices for securing the said cover; and to provide a press of the character hereinafter described, which is light, durable, simple, and economical in construction.

One embodiment of the present invention is illustrated in the accompanying drawings, wherein like characters of reference indicate corresponding parts in all the views.

Figure 1 is a perspective view of a press for fruit crates, constructed in accordance with my invention; Fig. 2 is a front elevation of the same; and Fig. 3 is a vertical cross section of the same.

In the drawings 4, 4, indicate shelves designed to form a platform to receive a fruit crate 5, as shown in Fig. 2 of the drawings. The shelves 4, 4, are located at either end of the device, and are held at the desired height by uprights 6, 6, which are secured at their lower ends to sills 7, 7. The shelves 4, 4, are preferably formed from wide angle iron, the uprights 6, 6, are formed preferably from narrow angle iron, and the sills 7, 7, from wide angle iron; these members are preferably united each to the other by suitable rivets. The sills 7 and shelves 4, 4, are maintained at the desired distance from each other by cross rods 8, 9 and 10, formed from flat iron. To render the construction more rigid, angle braces 11, 11, are secured to the front uprights 6, 6, and the member 10. This structure, thus far described, forms a rigid stand, adapted to rest upon the sills 7, 7, and to form a solid rest for a crate 5 upon the shelves 4, 4. Secured to the frame at the back, are brackets 12, 12, of sufficient strength to carry a nail tray 13 which is secured to horizontal extensions 14 provided to receive the said nail tray.

On the frame constructed as thus described, is mounted the mechanism whereby the fruit crate is held in position, and the top is pressed down to be secured. The pressing members are the loops 15, 15, the upright extensions of which are sufficiently separated to encompass the crate on which the top 16 is to be secured. The loops 15, 15, are pivotally mounted at 17 to a treadle 18, which is pivotally mounted at 19, 19, upon the rear uprights 6, 6, of the stationary frame. The treadle is normally maintained in a raised position by coil springs 20, 20, which are secured in suitable position upon the said treadle, and upon the downward extension of the shelves 4, 4. The limit of the upward travel of the treadle 18 may be regulated in any manner desired.

When the treadle is in its raised position, the loops 15, 15, extend considerably above the top of the crate to be handled. This is shown more particularly in Fig. 3 of the drawings, wherein the dotted lines indicate the top of the crate. In the lowered position of the treadle 18 the cross member of the loop 15 is drawn rigidly down upon the top of the crate as shown more particularly in Fig. 2 of the drawings.

The treadle 18 is forced to its lowered position by means of a treadle 21, which is maintained normally in the raised position shown in Figs. 1 and 2, by a coil spring 22 which is secured to the back brace 8 and to the treadle 21. The length of the treadle 21 is regulated to suit the needs of the operator, and is secured to the loops 15, 15, by connecting rods 23, 23 which are pivotally mounted at the eyelets 24 set in the side of the said treadle. The connecting rods 23 are of such a length, that when the treadle 21 is raised to the normal position, as shown in Fig. 1 of the drawings, the loops 15, 15 are spread laterally away from the shelves 4, 4, and from over the top of the crates mounted upon the said shelves. This is illustrated in Fig. 1 of the drawings. The lateral position of the loops 15, 15 is regulated by the out-turned ends 25, 25, of the cross bars 8 and 10.

Having a device of the construction such as described, the operation is as follows: The crate 5 properly packed, is placed on the shelves 4, 4, the loops 15, 15, being in the position as illustrated in Fig. 1 of the drawings, and permitting a free passage of the crate between the same. The top 16 is now placed on the box. In most cases, the crates or boxes are so packed that the fruit protrudes slightly above the upper edge of the sides of the box. If the top be (as is usual) in the form of shooks, or thin boards, these are placed in position. The foot of the operator being placed upon the treadle 21, the first part of the action of the treadle 21 is to draw inwardly the loops 15, 15, by the connecting rods 23, 23, and the treadle 18 remains stationary, thereby maintaining in position the lower end of the loops. This arrangement causes the said loops to assume a vertical position encompassing the ends of the box prior to the treadle 21 striking upon the treadle 18. When the treadle 21 rests upon the treadle 18 the two treadles move together. The movement of the treadle 18 compels the loops 15, 15, to draw straight downward upon the top 16 of the box or crate, and pressure is then applied upon the treadle 21 sufficient to seat the top 16 hard upon the frame of the box 5. The securing devices such as nails or screws, as the case may be, are now driven into the board or boards comprising the top 16 of the box, and the same is secured rigidly in position. To release the box, the operator removes his foot from the treadle 21, whereupon the springs 20 and 22 will cause the two treadles to assume the normal positions from which they were moved during the above-described operation. In this position, the box 5 is free to be removed from the shelves 4, 4. When the top 16 is drawn down upon the box 5 as above described, the nail tray 13 is found within convenient reach of the operator, and the fastening nails are extracted from the tray for securing, as stated, the box cover.

To the shelves 4—4 are secured the stops 26—26. These stops are provided to hold and locate the boxes in position on the shelves.

Having thus described my invention, I claim as new and desire to secure by Letters Patent:

1. A fruit press comprising a supporting frame having a shelf to hold the crate in elevated position; a treadle pivotally mounted in said frame below said shelf; two pulling loops adapted to extend over said crate and pivotally connected upon said treadle; means connected with said treadle to elevate the same; a foot power lever pivotally mounted in said supporting frame; links connecting said loops and said power lever and arranged to draw the said loops over the said crates by the depression of the said power lever; means connected with said power lever for raising the same; and rests extended from the said supporting frame to limit the spread of said loops.

2. A fruit press comprising a supporting frame having four corner posts; holding shelves for said supporting frame consisting of two pieces of angle iron riveted to said corner posts to extend one of the flat flanges of said angle irons on each side of said supporting frame; a treadle pivotally mounted in said supporting frame below said shelves; two pulling loops adapted to extend over the crates and pivotally connected with said treadle; lifting springs for said treadle attached to the same and to the said supporting frame; a foot power lever pivotally mounted in said supporting frame; links connecting said loops and said power lever and arranged to draw the said loops over the said crates by the depression of the said power lever; a spring connecting the said power lever and supporting frame adapted to raise the former; and rests extended from the said supporting frame to limit the spread of said loops.

3. A fruit press comprising a supporting frame having four corner posts; holding shelves for said supporting frame consisting of two pieces of angle iron riveted to said corner posts to extend one of the flat flanges of said angle irons on each side of said supporting frame; a treadle pivotally mounted in said supporting frame below said shelves; two pulling loops adapted to extend over the crates and pivotally connected with said treadle; lifting springs for said treadle attached to the same and to the said supporting frame; a foot power lever pivotally mounted in said supporting frame; links connecting said loops and said power lever and arranged to draw the said loops over the said crates by the depression of the said power lever; a spring connecting the said power lever and supporting frame adapted to raise the former; and laterally extended brace rods constructed from bar metal and riveted to the said corner posts, the ends of said braces being extended beyond the said corner posts and having outwardly turned ends to form guides and rests for the said loops.

4. A fruit press comprising a supporting frame having a shelf to hold the crate in elevated position; a treadle pivotally mounted in said frame below said shelf; two pulling loops adapted to extend over said crate and pivotally connected upon said treadle; means connected with said treadle to elevate the same; a foot power lever pivotally mounted in said supporting frame; links connecting said loops and said power lever and arranged to draw the said loops over the said crate by the depression of the said power lever; means connected with said power lever for raising the same; rests extended from the said supporting frame to limit the spread of said loops; a standing back frame rigidly secured to said supporting frame and elevated above the said loops; and a tool holding shelf supported upon said frame.

5. A fruit press comprising a supporting frame having a shelf to hold the crate in elevated position; a treadle pivotally mounted in said frame below said shelf; two pulling loops adapted to extend over said crate and pivotally connected upon said treadle; means connected with said treadle to elevate the same; a foot power lever pivotally mounted in said supporting frame; links connecting said loops and said power lever and arranged to draw the said loops over the said crate by the depression of the said power lever; means connected with said power lever for raising the same; rests extended from the said supporting frame to limit the spread of said loops; a standing back frame rigidly secured to said supporting frame and elevated above the said loops; a tool holding shelf supported upon said frame; and laterally disposed gages connected with said first mentioned shelf and upturned above the same to hold the said crate in position.

6. A fruit press comprising a supporting frame having four corner posts; holding shelves for said supporting frame consisting of two pieces of angle iron riveted to said corner posts to extend one of the flat flanges of said angle irons on each side of said supporting frame; a treadle pivotally mounted in said supporting frame below said shelves; two pulling loops adapted to extend over the crates and pivotally connected with said treadle; lifting springs for said treadle attached to the same and to the said supporting frame; a foot power lever pivotally mounted in said supporting frame; links connecting said loops and said power lever and arranged to draw the said loops over the said crates by the depression of the said power lever; a spring connecting the said power lever and supporting frame adapted to raise the former; laterally extended brace rods constructed from bar metal and riveted to the said corner posts, the ends of said braces being extended beyond the said corner posts and having outwardly turned ends to form guides and rests for the said loops; and a standing back frame rigidly secured to said supporting frame and elevated above the said loops.

In testimony whereof I have signed my name to this specification in the presence of two subscribing witnesses.

THOMAS PLINY MADDOX.

Witnesses:
FRANK G. HUGHES,
STEPHEN E. MADDOX.